Patented Feb. 19, 1946

2,395,012

UNITED STATES PATENT OFFICE 2,395,012

PRODUCTION OF KETONES

William H. Reeder, III, Olean, N. Y., and George A. Lescisin, South Charleston, W. Va., assignors to Carbide and Carbon Chemicals Corporation, a corporation of New York No Drawing. Application May 18, 1943, Serial No. 487,489

7 Claims. (Cl. 260—595)

This invention relates to the production of ketones; and more especially it concerns their production by reacting an ester of a β-ketonic carboxylic acid such as β-ketobutyric acid, or an ester of a substituted β-ketonic carboxylic acid such as α-aceto, β-ketobutyric acid, with a carboxylic acid, preferably in the presence of a catalyst for the resultant deesterification and decarboxylation reactions. The invention has especial utility for the production of β-diketones by reacting the esters of the β-diketocarboxylic acids, such as the various diacylacetic acid esters, with aliphatic saturated carboxylic acids, such as glacial acetic acid, propionic acid, butyric acid, 2-ethylbutyric acid, 2-ethylhexoic acid and other fatty acids. However, unsaturated carboxylic acids, such as acrylic acid and crotonic acid; and dicarboxylic acids such as malonic acid and succinic acid; may be used.

Heretofore efforts have been made to decompose acylacetoacetic esters by heating them with hydrochloric acid at elevated temperatures around 140° C. Under such conditions such an ester breaks down into an alkyl methyl ketone, acetic acid, an alcohol and carbon dioxide.

Other efforts have been made to produce β-diketones by the hydrolytic decarboxylation of β-ketonic acid esters by heating such esters with water at elevated temperatures, in the presence of a catalytic amount of a mineral acid. Such hydrolytic decarboxylations gave quite low yields of the desired diketones, the predominant reaction in the case of diacetylacetic methyl ester apparently being one splitting off one acetyl group and yielding a mixture of acetone, methanol, acetic acid and carbon dioxide.

The present invention is based in important part upon the discovery that, by reacting a β-ketonic acid ester, or a substituted β-ketonic acid ester, with a carboxylic acid, preferably in the presence of a catalyst or reaction promoter, a concurrent deesterification and decarboxylation results in the production of excellent yields of the corresponding ketone, in contrast to those secured by the hydrolytic decarboxylation procedure. Preferably, water is excluded from the compounds being reacted, insofar as is possible, to minimize or eliminate the tendency for hydrolysis of the ester. However, any small amount of water which may be present in the compounds merely causes some loss of the starting materials, after which the principal reaction here described then proceeds under substantially anhydrous conditions.

The principal reaction involved appears to be that indicated by the equation:

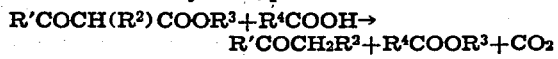

wherein R' represents either an alkyl or an alkanoyl group, $R^2$ represents either an alkyl, an acyl, or an alkanoyl group, and $R^3$ and $R^4$, respectively, represent the same or a different alkyl group.

In the practice of the invention according to a preferred modification thereof, the β-ketonic acid ester and the carboxylic acid, with or without a catalyst for the decarboxylation and deesterification reactions, are heated to a suitable reaction temperature, which conveniently may be the refluxing temperature of the mixture, although lower and higher temperatures may be employed. Preferably the reaction is conducted in the presence of a catalyst for the decarboxylation and deesterification reactions, such as organic and inorganic compounds of boron—e. g.— boric acid, boron trifluoride, and the alkyl borates, sulfuric acid; hydrochloric acid, phosphoric acid, and other inorganic acids; metal salts of inorganic acids, such as aluminum chloride, ferric chloride, baryllium chloride, and monobasic sodium orthophosphate; and the alkali metal and alkaline earth metal salts of organic acids, such as sodium acetate, and the magnesium salt of the methyl ester of diacetylacetic acid.

The ratio of β-ketonic acid ester to carboxylic acid may vary within a wide range, but excellent yields of the desired ketones are secured where the ester and acid are employed in molar ratios ranging between 1:1 and 1:8 or more, especially when a catalyst of the type described is used.

The products of the decarboxylation reaction include, in addition to the β-diketone, carbon dioxide and an ester of the carboxylic acid employed. The carbon dioxide may escape as rapidly as formed in the reaction, or in the case of operations conducted under superatmospheric pressure, may subsequently be released.

After completion of the reaction, the reaction mixture is neutralized with an alkaline compound such as sodium hydroxide or sodium carbonate. The diketone and the ester of the carboxylic acid concurrently formed are then separately isolated from the neutralized reaction mixture, usually by a fractional distillation with steam, or by a vacuum distillation.

The following examples illustrate certain modifications of the invention:

*Example 1*

0.25 mol of methyl diacetylacetate (the methyl ester of α-aceto, β-ketobutyric acid), 1.75 mols of glacial acetic acid and 0.47 mol of boric acid were charged into a glass reaction vessel connected with a glass refluxing column filled with glass helices and having a condensing head. The mixture was refluxed for 7.5 hours, after which the reaction mixture was neutralized with sodium hydroxide. The neutralized mixture was then steam distilled. The pentanedione-2,4 (acetylacetone) present therein formed with water a heterogeneous binary constant-boiling mixture having a minimum boiling point of 92°–93° C. The upper layer of this constant-boiling mixture contained about 90% of the pentanedione-2,4. A yield of over 75% of this diketone was recovered.

Corresponding results were secured by fractionally distilling the aforesaid neutralized reaction mixture under absolute pressures within the range from 400 mm. to 100 mm. of mercury.

Under operating conditions similar to those recited in Example 1, but where no catalyst was used, much lower yields of the diketone were secured. Yields somewhat lower than those secured in Example 1 also were obtained under similar conditions, but wherein (1) sulfuric acid, (2) dry hydrochloric acid, (3) a mixture of boric acid and oxalic acid, (4) ferric chloride, (5) beryllium chloride, (6) boron trifluoride, and (7) aluminum chloride, respectively, were substituted for like amounts of the boric acid.

Example 2

Following the procedure described in Example 1, a mixture of 0.25 mol of methyl diacetylacetate, 1.75 mols of 2-ethylbutyric acid and 0.042 mol of sulfuric acid provided a yield of around 68% of pentanedione-2,4. Somewhat lower yields of this β-diketone were obtained by substituting for the sulfuric acid, 0.112 mol of dry hydrochloric acid; and by substituting therefor a mixture of 0.023 mol boric acid and 0.018 mol oxalic acid.

Example 3

Under conditions similar to those recited in Example 1, 0.5 mol of the ethyl ester of diacetylacetic acid, 0.8 mol of 2-ethylbutyric acid and 0.05 mol of boric acid were mixed and reacted by refluxing the mixture for 7.5 hours.

The resultant reaction products were neutralized with sodium hydroxide, and the neutralized mixture fractionally distilled under an absolute pressure of 100 mm. of mercury. The pentanedione-2,4 present therein distilled at 69° C. under that pressure, and was recovered in a 42% yield, based on the diacetylacetic ester.

In a similar experiment conducted under similar conditions excepting that no catalyst was used, a considerably lower yield of pentanedione-2,4 was secured.

Example 4

Under conditions similar to those recited in Example 1, 0.25 mol of the methyl ester of diacetylacetic acid, 0.875 mol of glacial acetic acid and 0.041 mol of sodium acetate were mixed and reacted while heating and refluxing the mixture for 7.5 hours. The reaction mixture was then steam distilled, and the pentanedione-2,4 present therein separately recovered in a yield of over 35%.

Still higher yields were secured under conditions similar to those recited in Example 4, but substituting for the sodium acetate, 0.032 mol of trimethyl borate and 0.023 mol of tributyl borate, respectively.

When using an alkaline or neutral catalyst, such as sodium acetate or other alkali metal salt of an organic acid, or when using an organic ester of an inorganic acid such as an alkyl borate, no neutralization of the reaction mixture is required prior to the fractional distillation thereof.

Obviously esters of β-ketonic acids and substituted β-ketonic acids other than those mentioned in the examples may be employed, including other esters of the aci-β-ketonic acid esters. By suitably selecting the appropriate β-ketonic ester, a large number of ketones may be prepared, as indicated in the following table:

| Ester starting material | Ketone produced |
| --- | --- |
| Propionylacetic methyl ester | $C_2H_5COCH_3$ |
| Propylacetoacetic ethyl ester | $CH_3COCH_2C_3H_7$ |
| Butyrylbutyric ethyl ester | $C_3H_7COCH_2C_3H_7$ |
| Decoylacetic ethyl ester | $C_9H_{19}COCH_3$ |
| Propionylacetoacetic ethyl ester | $C_2H_5COCH_2COCH_3$ |
| n-Butyrylacetoacetic methyl ester | $C_3H_7COCH_2COCH_3$ |
| Butyryl isobutyrylacetic ethyl ester | $C_3H_7COCH_2COCH(CH_3)_2$ |

By the practice of the invention involving de-esterification and decarboxylation of an ester of a β-ketonic acid, excellent yields are secured of ketones, including β-diketones, that are valuable as solvents and are useful as intermediates in the production of other chemical compounds.

The expression "an ester of a β-diketonic carboxylic acid" is used in the claims to designate an ester of a β-ketonic carboxylic acid substituted on the α-carbon atom by an acyl group, whereby each of two keto groups occupies a beta position relative to the carbon atom of the carboxyl group, and the keto groups are in the beta position relative to each other.

The invention is susceptible of modification within the scope of the appended claims.

We claim:

1. Process for producing β-diketones, which comprises reacting an ester of a β-diketonic carboxylic acid with an aliphatic carboxylic acid, under substantially anhydrous conditions and recovering from the resultant reaction mixture the β-diketone thus produced.

2. Process for producing β-diketones, which comprises reacting an ester of a β-diketonic carboxylic acid with an aliphatic carboxylic acid under substantially anhydrous conditions in the presence of an acid catalyst, neutralizing the reaction mixture, and recovering from the neutralized reaction mixture the β-diketone thus produced.

3. Process for producing β-diketones, which comprises reacting an ester of a β-diketonic carboxylic acid with an aliphatic carboxylic acid under substantially anhydrous conditions in the presence of an organic borate, and recovering from the resultant reaction mixture the β-diketone thus produced.

4. Process for producing β-diketones, which comprises reacting an ester of a β-diketonic carboxylic acid with an aliphatic carboxylic acid under substantially anhydrous conditions in the presence of an alkali metal compound of an organic acid, and recovering from the resultant reaction mixture the β-diketone thus produced.

5. Process for producing acetylacetone, which comprises reacting an ester of diacetylacetic acid with acetic acid, under substantially anhydrous conditions, in the presence of a small amount of an acid catalyst, neutralizing the resultant reaction mixture, and separately recovering from the neutralized mixture the acetylacetone thus produced.

6. Process for producing acetylacetone, which comprises reacting an ester of diacetylacetic acid with acetic acid, under substantially anhydrous conditions, in the presence of a small amount of an organic borate, and separately recovering from the resultant reaction mixture the acetylacetone thus produced.

7. Process for producing acetylacetone, which comprises reacting an ester of diacetylacetic acid with acetic acid, under substantially anhydrous conditions, in the presence of an alkali metal compound of an organic acid, and separately recovering from the resultant reaction mixture the acetlyacetone thus produced.

WILLIAM H. REEDER, III.
GEORGE A. LESCISIN.